United States Patent
Flynn (10) Patent No.: US 7,194,647 B2
(45) Date of Patent: Mar. 20, 2007

(54) DATA PROCESSING PERFORMANCE CONTROL

(75) Inventor: David Walter Flynn, Cambridge (GB)

(73) Assignee: ARM Limited, Cambridge (GB)

( * ) Notice: Subject to any disclaimer, the term of this patent is extended or adjusted under 35 U.S.C. 154(b) by 443 days.

(21) Appl. No.: 10/715,594

(22) Filed: Nov. 19, 2003

(65) Prior Publication Data

US 2004/0138833 A1 Jul. 15, 2004

(30) Foreign Application Priority Data

| Jan. 13, 2003 | (GB) | .................... | 0300710.1 |
| Jan. 13, 2003 | (GB) | .................... | 0300712.7 |
| Jan. 13, 2003 | (GB) | .................... | 0300713.5 |
| Jan. 27, 2003 | (GB) | .................... | 0301852.0 |

(51) Int. Cl.
*G06F 1/00* (2006.01)
*G06F 1/26* (2006.01)

(52) U.S. Cl. .................... 713/322; 713/300; 713/320

(58) Field of Classification Search ................ 713/300, 713/320, 322
See application file for complete search history.

(56) References Cited

U.S. PATENT DOCUMENTS

| 4,823,309 | A | * | 4/1989 | Kusaka et al. .............. 713/300 |
| 5,627,412 | A | | 5/1997 | Beard |
| 5,655,127 | A | | 8/1997 | Rabe et al. |
| 5,692,201 | A | | 11/1997 | Yato |
| 5,760,636 | A | * | 6/1998 | Noble et al. ................ 327/513 |
| 5,812,860 | A | | 9/1998 | Horden et al. |
| 6,016,548 | A | | 1/2000 | Nakamura et al. |
| 6,065,122 | A | | 5/2000 | Wunderlich et al. |
| 6,073,244 | A | | 6/2000 | Iwazaki |
| 6,088,807 | A | * | 7/2000 | Maher et al. ............... 713/324 |
| 6,173,409 | B1 | | 1/2001 | Watts, Jr. et al. |
| 6,182,232 | B1 | | 1/2001 | Klein |
| 6,275,948 | B1 | | 8/2001 | Bays et al. |
| 6,425,086 | B1 | * | 7/2002 | Clark et al. ................. 713/322 |
| 2002/0140467 | A1 | | 10/2002 | Naffziger et al. |

OTHER PUBLICATIONS

The Technology Behind Crusoe Processors, by Alexander Klaiber, Transmeta Corporation, Jan. 2000, pp. 1-17.
Longrun Power Management, by Marc Fleischmann, Transmeta Corporation, Jan. 17, 2001, pp. 1-17.

* cited by examiner

*Primary Examiner*—Rehana Perveen
*Assistant Examiner*—Stefan Stoynov
(74) *Attorney, Agent, or Firm*—Nixon & Vanderhye PC (57) ABSTRACT

Performance control of a processor core 52 is achieved by modulating between a processing mode power supply configuration which the processor core 52 is clocked and a holding mode power supply configuration which the processor core 52 is not clocked. By modulating between these two power supply configuration modes, a target performance level may be achieved and energy consumption whilst in the holding mode can be reduced.

30 Claims, 10 Drawing Sheets

| Desired performance 6-bit | Control signal value | |
|---|---|---|
| 0 | 00000000 | Idle |
| 1-4 | 00000001 | |
| 5-8 | 00000011 | |
| 9-12 | 00000111 | |
| 13-16 | 00001111 | |
| 17-20 | 00011111 | |
| 21-24 | 00111111 | |
| 25-28 | 01111111 | |
| 29-32 | 11111111 | |

Example mapping

CPU clock generator

| Perf/32 | Binary | Fractional | % | Coding | Note |
|---|---|---|---|---|---|
| 32 | 1.00000 | 1.00000 | 100.0% | 11111111111111111111111111111111 | MAX |
| 31 | 0.11111 | 0.96875 | 96.9% | 01111111111111111111111111111111 | |
| 30 | 0.11110 | 0.93750 | 93.8% | 00111111111111111111111111111111 | |
| 29 | 0.11101 | 0.90625 | 90.6% | 00011111111111111111111111111111 | |
| 28 | 0.11100 | 0.87500 | 87.5% | 00001111111111111111111111111111 | |
| 27 | 0.11011 | 0.84375 | 84.4% | 00000111111111111111111111111111 | |
| 26 | 0.11010 | 0.81250 | 81.3% | 00000011111111111111111111111111 | |
| 25 | 0.11001 | 0.78125 | 78.1% | 00000001111111111111111111111111 | |
| 24 | 0.11000 | 0.75000 | 75.0% | 00000000111111111111111111111111 | |
| 23 | 0.10111 | 0.71875 | 71.9% | 00000000011111111111111111111111 | |
| 22 | 0.10110 | 0.68750 | 68.8% | 00000000001111111111111111111111 | |
| 21 | 0.10101 | 0.65625 | 65.6% | 00000000000111111111111111111111 | |
| 20 | 0.10100 | 0.62500 | 62.5% | 00000000000011111111111111111111 | |
| 19 | 0.10011 | 0.59375 | 59.4% | 00000000000001111111111111111111 | |
| 18 | 0.10010 | 0.56250 | 56.3% | 00000000000000111111111111111111 | |
| 17 | 0.10001 | 0.53125 | 53.1% | 00000000000000011111111111111111 | |
| 16 | 0.10000 | 0.50000 | 50.0% | 00000000000000001111111111111111 | |
| 15 | 0.01111 | 0.46875 | 46.9% | 00000000000000000111111111111111 | |
| 14 | 0.01110 | 0.43750 | 43.8% | 00000000000000000011111111111111 | |
| 13 | 0.01101 | 0.40625 | 40.6% | 00000000000000000001111111111111 | |
| 12 | 0.01100 | 0.37500 | 37.5% | 00000000000000000000111111111111 | |
| 11 | 0.01011 | 0.34375 | 34.4% | 00000000000000000000011111111111 | |
| 10 | 0.01010 | 0.31250 | 31.3% | 00000000000000000000001111111111 | |
| 9 | 0.01001 | 0.28125 | 28.1% | 00000000000000000000000111111111 | |
| 8 | 0.01000 | 0.25000 | 25.0% | 00000000000000000000000011111111 | |
| 7 | 0.00111 | 0.21875 | 21.9% | 00000000000000000000000001111111 | |
| 6 | 0.00110 | 0.18750 | 18.8% | 00000000000000000000000000111111 | |
| 5 | 0.00101 | 0.15625 | 15.6% | 00000000000000000000000000011111 | |
| 4 | 0.00100 | 0.12500 | 12.5% | 00000000000000000000000000001111 | |
| 3 | 0.00011 | 0.09375 | 9.4% | 00000000000000000000000000000111 | |
| 2 | 0.00010 | 0.06250 | 6.3% | 00000000000000000000000000000011 | |
| 1 | 0.00001 | 0.03125 | 3.1% | 00000000000000000000000000000001 | |
| 0 | 0.00000 | 0.00000 | 0.0% | 00000000000000000000000000000000 | IDLE |

DATA PROCESSING PERFORMANCE CONTROL

BACKGROUND OF THE INVENTION

1. Field of the Invention

This invention relates to the field of data processing systems. More particularly, this invention relates to the field of the control of data processing performance, such as, for example, so as to reduce the energy consumed by a data processing system.

2. Description of the Prior Art

An important consideration in data processing systems is their energy consumption. Data processing systems which consume less energy allow longer battery life in mobile devices, tend to run cooler and more reliably, and require fewer special engineering considerations to deal with heat dissipation and the like. It is strongly desirable to reduce the energy consumption of data processing systems.

Balanced against a desire to reduce the energy consumption of data processing systems is a simultaneous desire to increase their performance level to deal with increasingly computationally intensive tasks. Such tasks often require highly intensive processing operations for short periods of time followed by relatively long idle times in which little computation is required.

In order to address the above two factors, it is known to produce data processing systems that are able to change their performance level so that high computational performance is provided in some configurations and low energy consumptions in other configurations. Known systems, such as the LongRun software produced by Transmeta, or the SpeedStep systems produced by Intel, allow a processor to be switched between such different configurations. In order to match the desired performance goals, a high computational performance configuration would be one with a relatively high operating voltage and a relatively high processor clock frequency. Conversely, a low energy consumption configuration has a relatively low operating voltage and a relatively low processor clock frequency.

As well as providing the performance and energy management capabilities described above, another important design characteristic is that hardware and software designs should be re-useable in a relatively large number of different circumstances. If computer software, such as operating system software, has to be re-written for different hardware implementations, or the hardware designs significantly modified for different hardware implementations, then this is strongly disadvantageous.

According to one aspect the present invention provides apparatus for processing data, said apparatus comprising:

a processing circuit having a power supply configuration and driven by a clock signal, said processing circuit being operable:
  (i) in a processing mode to perform data processing operations when said power supply configuration has a processing configuration and said clock signal is clocked; and
  (ii) in a holding mode to hold state without performing data processing operations when said power supply has a holding configuration and said clock signal is stopped; and a power supply and clock signal control circuit responsive to a target rate signal indicative of a target rate of data processing operations to be performed by said processing circuit to modulate a target rate mode control signal to switch said processing circuit between said processing mode and said holding mode so as to achieve said target rate.

The present technique provides a system which is able to support a range of performance levels by switching between a processing mode in which the processing circuit is clocked and a holding mode in which the processing circuit is not clocked. Modulating the switching between the two modes in accordance with a target rate signal indicative of a target rate of data processing system operations allows variable performance to be achieved. Furthermore, modulating between the holding mode and the processing mode allows a wide range of performance levels to be achieved whilst requiring only two modes to be designed into the hardware, validated, tested etc. The holding mode does not perform any processing since the clock has stopped and accordingly may simply be validated to the extent of showing that state is preserved in that holding mode. The holding mode may be arranged with a power supply configuration that reduces energy consumption, such as reducing the rail voltage, using body biasing, etc. The providing of multiple performance levels without the need to provide multiple levels of voltage operation which are clocked also simplifies the integration of the processing circuit with further circuits since such a variety of operating voltages do not need to be accommodated and level shifting requirements can be reduced.

Preferred embodiments of the invention are such that the processing circuit generates a busy signal which indicates whether or not it is safe to switch the processing circuit from the processing mode to the holding mode. Thus, relatively simple power supply control circuits may be utilised with the processing circuit itself being able to override their operation so that they do not cause problems due to inappropriate power supply switching at sensitive points in the processing circuit operation, e.g. during pending data transfer with other circuit elements and the like.

The latency issues associated with operating the processing circuit in a holding mode may be addressed by providing a priority signal to override the target rate mode control signal such that the processing circuit can be switched back to the processing mode independently of the target rate or prevent it from switching into the holding mode independently of the target rate.

Particular examples of priority signals are interrupt signals and hardware real-time clock signals.

The present power control mechanism is advantageously simple to implement in that the target rate mode control signal, the busy signal and any priority signal may be logically combined with, for example, a simple OR gate in order to produce a signal for switching the processing circuit between the processing mode and the holding mode. This type of control also readily scales across multiple processing circuits which it may be desired to control in a coordinated manner.

As previously mentioned, the processing mode and the holding mode have different power supply configurations. These configurations could take a variety of different forms, the tendency being for the holding mode to be one in which energy consumption is lowered. Particularly preferred embodiments are ones in which the holding configuration corresponds to the power supply having a lower potential difference than the power supply in the processing configuration.

Given that the holding mode is one in which the processing circuit is not clocked, the potential difference in that mode may be reduced to a level which is insufficient to allow such clocking, but which produces enhanced energy saving.

Since in the holding mode the processing circuit is not clocked, simple signal clamping circuits can be provided around the processing circuit for use in the holding mode. This avoids the need to provide at least some of the more complex level shifter circuits that are required when multiple domains having different operating voltages interact with one another.

It will be appreciated that the processing circuit can take a wide variety of different forms, but the invention is particularly well suited to systems in which the processing circuit is a processor core.

In preferred embodiments of the invention active high signaling is used from the processing circuit to one or more further circuits. When the processing circuit is not being clocked and is in the holding mode, then these signals can be clamped down to ground in the same way as if the processing circuit was completely powered down.

Since the technique uses a clock signal which is modulated between being used and not used, the need to provide multiple clock signals having different frequencies is reduced. The clock frequency used may be a fixed frequency which is permanently available thus avoiding delays that can be introduced by having to start-up clock generators to supply specific intermediate frequencies corresponding to different performance levels.

It will be appreciated that when switching power supply configurations, a finite amount of time is needed to move from the holding mode configuration to the processing mode configuration and it is unsafe to start clocking in the processing circuit until the power supply has the processing mode power supply configuration properly established. Accordingly, in preferred embodiments a power supply generator provides a ready signal to the clock generator to indicate that it is safe to start clocking the processing circuit.

SUMMARY OF THE INVENTION

Viewed from another aspect the present invention provides a method of processing data, said method comprising the steps of:
operating a processing circuit powered by a power supply signal and driven by a clock signal such that:
(i) in a processing mode said processing circuit performs data processing operations when said power supply signal has a processing configuration and said clock signal is clocked; and
(ii) in a holding mode said processing circuit holds state without performing data processing operations when said power supply has a holding configuration and said clock signal is stopped; and
in response to a target rate signal indicative of a target rate of data processing operations to be performed by said processing circuit using a power supply and clock signal control circuit to modulate a target rate mode control signal to switch said processing circuit between said processing mode and said holding mode so as to achieve said target rate.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
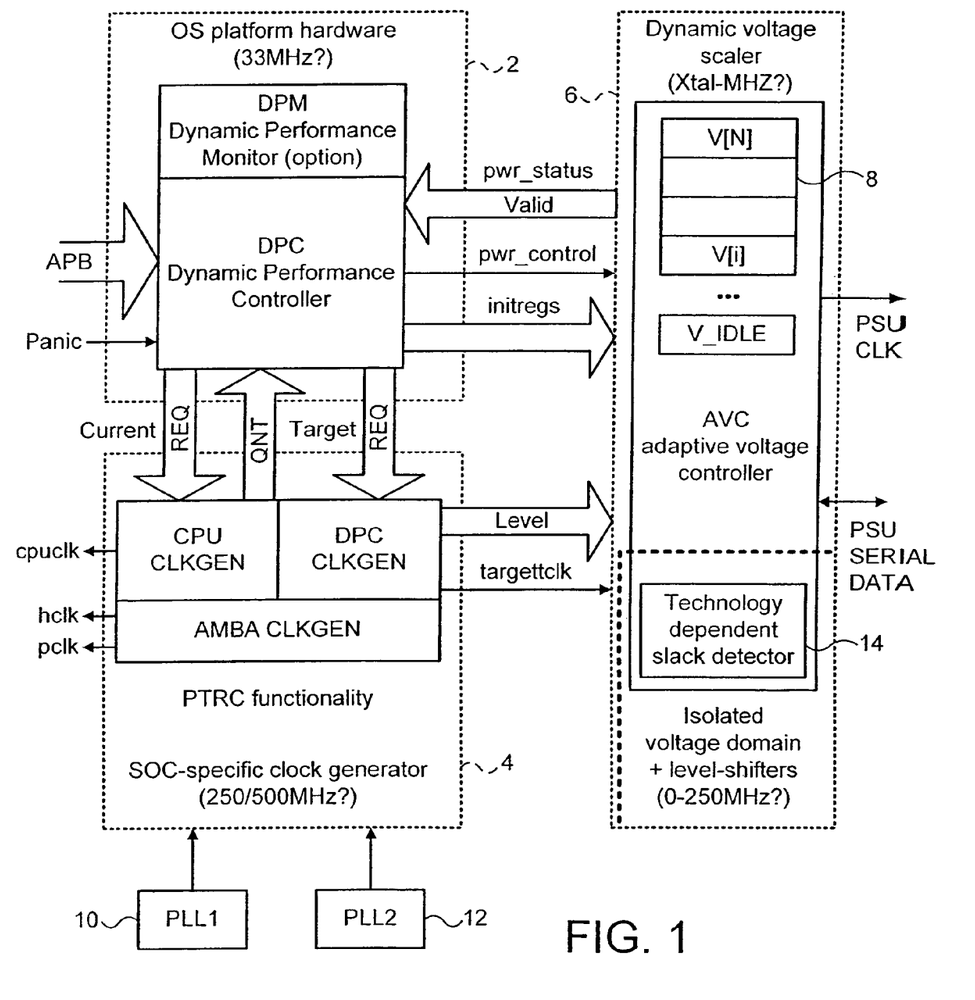
FIG. 1 schematically illustrates a portion of a data processing system including a performance controller, a clock generator and a voltage controller.

FIG. 1 illustrates a portion of a data processing system including a performance controller 2, a clock generator 4 and a voltage controller 6. The circuits in FIG. 1 typically form part of a larger integrated circuit which includes a processor, such as an ARM processor produced by ARM Limited of Cambridge, England, as well as other circuit elements, possibly as part of a system-on-chip design. The circuit elements other than the performance controller 2, the clock generator 4 and the voltage controller 6 are omitted from FIG. 1 for the sake of simplicity. The performance controller 2 receives a performance level request signal/value which is generated under program instruction control by a computer program, such as an operating computer program, executing upon the processor (not illustrated). This desired data processing performance level request may be written to a dedicated memory location within the memory address space for such a purpose, may be written to a control register, such as a control register within a configuration coprocessor, e.g. CP15 ARM architecture or stored in some other way. The performance controller 2 also incorporates a performance monitor, which may be one or more performance counters counting the passage of real time, clock signals, work performed or other performance monitoring parameters. When the performance controller 2 receives a data processing performance level request indicative of a change in the desired performance level, then it is used issue a request for the new target clock speed to the clock generator 4 and a request for a new target voltage to the voltage controller 6. It will be appreciated that once the program instruction has written its desired data processing performance level to the appropriate location it hands control of how that is put into effect to the hardware (performance controller 2). The performance controller 2 maps the desired data processing performance request to appropriate control signal values for the clock generator 4 and voltage controller 6 (the performance controller 2 includes a mapping circuit). The data processing performance request signal may be a Gray coded signal value or a simple linearly coded value. The mapping can be to a thermometer coded control signal value as this provides good resistance against sampling errors when sampling between clock domains which may be asynchronous. Furthermore, this provides a type of fail-safe behaviour whereby sampling errors tend to produce the lowest stable synchronised value for use.

The control signal passed to the voltage controller 6 instructs the voltage controller 6 to adopt a new voltage output level. The voltage output levels that are supported may be configured by programming configuration parameter registers 8 within the voltage controller 6 at bootup or some other time. The voltage controller 6 takes a finite amount of time to ramp up or down to the new voltage level. In some embodiments, as it is changing to its new voltage level, the voltage controller 6 may pass through one or more intermediate levels which it would be capable of supporting an intermediate performance level pending reaching the final performance level (in other embodiments described later, a single operating frequency clock signal and a stopped clock may be used). The voltage controller 6 generates current operation signals indicative of the current voltage levels it can support and passes these back to the performance controller 2 where they may be acted upon to trigger use of associated clock frequencies as appropriate and available.

The performance controller 2 also converts the desired data processing performance level specified by program control into control signals that are passed to the clock generator 4. These control signals specify a target clock frequency. The clock generator 4 is supplied with a variety of clock signals from one or more phase lock loop circuits 10, 12. One of these phase lock loop circuits 10 is permanently enabled and serves to provide the minimum and maximum clock frequencies supportable as well as some intermediate frequencies. Another of the phase lock loop circuits 12 is selectively available and can be powered down to save energy when the intermediate clock frequencies which it generates are not required.

The clock generator 4 generates a performance controller clock signal which is supplied to a technology dependent slack detector 14 within the voltage controller 6. This arrangement can be used to provide an additional level of control within the voltage controller 6 such that the voltage it is generating can be adjusted to support the target clock frequency with a reduced overshoot, i.e. the voltage level generated is just sufficient, with a small buffer, to support the target clock frequency. This fine level of control of the voltage output can be considered to be secondary to the gross performance level changes conducted in response to changes in desired data processing performance levels specified by program instructions. When a change to an increased performance level has been indicated, the voltage controller 6 will attempt to increase the voltage it is generating and when it is providing an increased voltage this is indicated back to the performance controller 2 which in turn can then control the CPU clock generator within the clock generator 4 to output a CPU clock signal cpuclk for supply to the processor having a new clock frequency sustainable with the new voltage, which may be an intermediate clock frequency on the way to the ultimate desired clock frequency. The clock generator 4 may not be capable of generating clock signals with the granularity that can be specified in the control signal values and accordingly passes back a quantised clock signal value corresponding to the actual clock frequency it is generating. Alternatively, this quantisation taking account of the actual capabilities of the clock generator 4 can take place within the mapping performed by the performance controller from the desired data processing performance request into the control signals. In another embodiment discussed later, the voltage controller has two possible voltage output levels, a high level for use in a processing mode and a low level for use in a holding mode when the clock is stopped.

Figure 2:
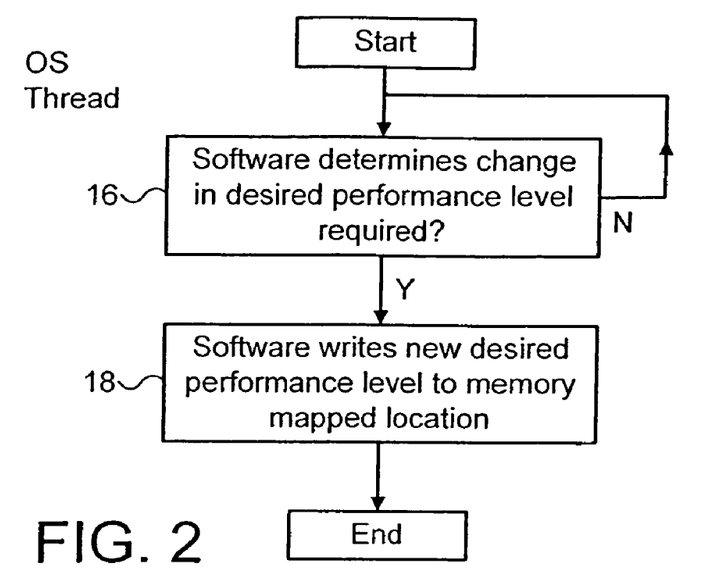
FIG. 2 is a flow diagram schematically illustrating the operation of an operating system computer program in setting a desired performance level.

FIG. 2 schematically illustrates the processing operations which may be performed by an operating system computer program executing on a processor in accordance with one example of the technique. At step 16, the relevant processing thread waits until a determination is made of a need to change performance level. This need may be indicated by changes in external parameters, such as key presses by a user, or may be internally triggered through monitoring of the operational performance of the system using performance monitoring counters such as those previously discussed. When such a desired performance level change is detected, processing proceeds to step 18 at which the software performs a write to a memory mapped location dedicated to storing the desired data processing performance request level. The action of the computer program code is to detect the requirement for a change in performance level and to write this requirement to a memory location. No control feedback need be provided to monitor that the desired change in performance actually takes place or how it takes place. There is an abstraction between the activity of the computer program in making this write and the underlying hardware mechanisms which act upon the request. This facilitates the use of substantially unaltered computer programs in a variety of environments taking advantage of whatever performance management mechanisms may or may not be provided within those environments.

Figure 3:
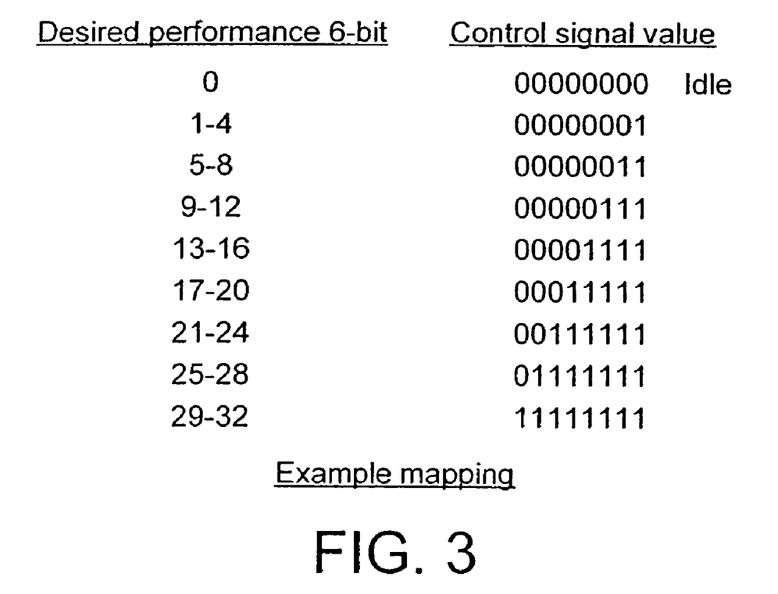
FIG. 3 schematically illustrates an example mapping between desired performance level and control signal value.

FIG. 3 schematically illustrates an example mapping between a 6-bit desired data processing performance request signal (which may optionally be Gray coded) and a corresponding thermometer coded control signal value. In this case whilst there are 33 possible performance levels, there are only 9 possible control signal values. Accordingly, there is a quantisation between the desired performance levels and control signal values. This quantisation is arranged such that the control signal value corresponds to the maximum performance level within a range of performance levels which may be mapped to that control signal value. There is a monotonic increase in the desired performance signal and the performance level this is intended to specify. Thus, the desired performance level can be a binary fraction representing a percentage of the maximum performance level that may be achievable in the system. This is a convenient and flexible way to abstract the performance level request in a manner which it can be controlled by program instructions in a wide variety of different hardware environments and for a wide variety of different processing purposes.

Figure 4:
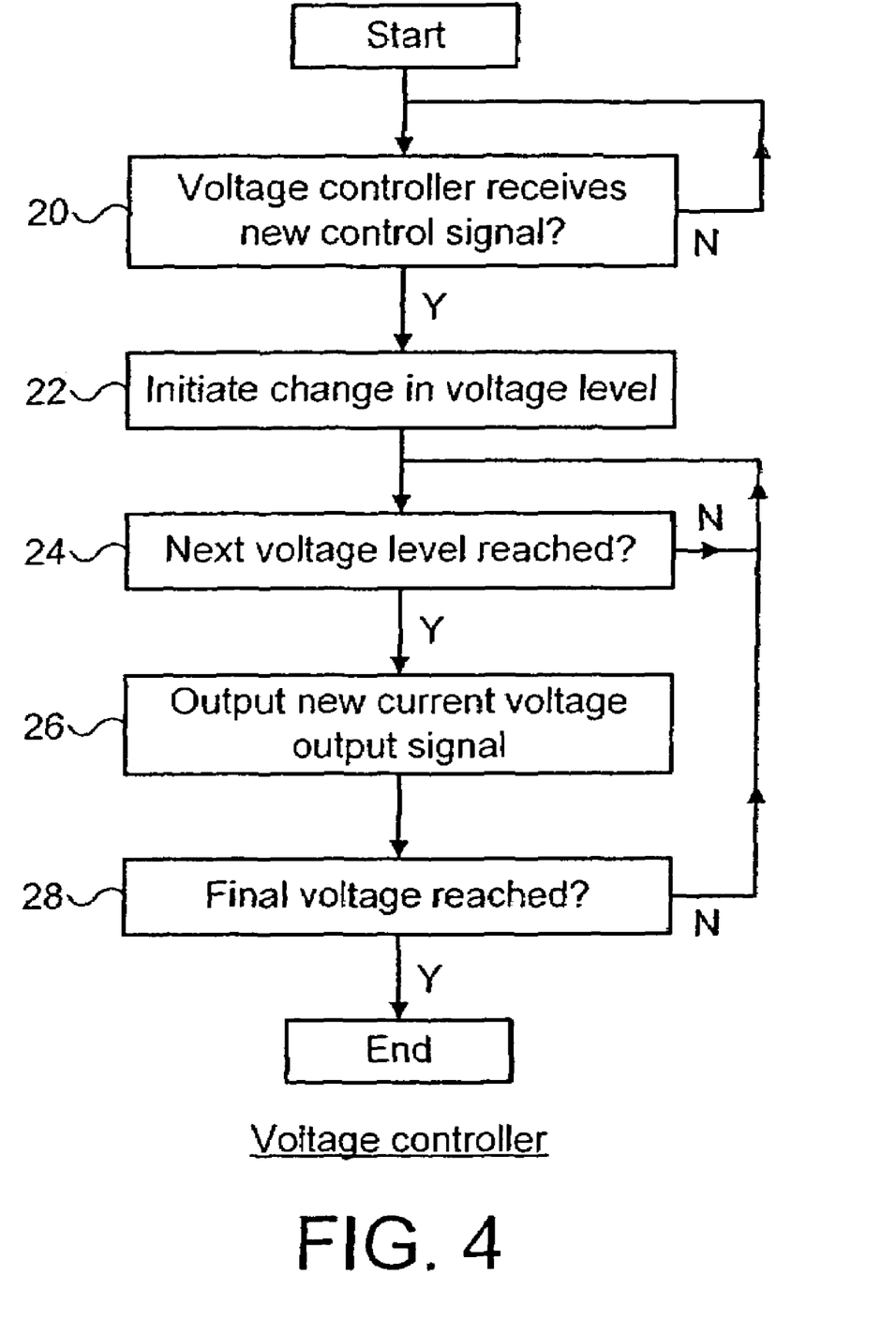
FIG. 4 is a flow diagram schematically illustrating the control of a voltage controller.

FIG. 4 schematically illustrates control of the voltage controller 6 in embodiments having multiple voltage levels corresponding to active processing modes in which the clock is running. At step 20 the voltage controller waits for receipt of a new control signal. When a new control signal is received, processing proceeds to step 22 at which a change in the voltage level supplied is initiated. This change may be an increase or a decrease. The voltage controller 6 has a finite slew rate at which it can change its output. Step 24 monitors until the next sustainable voltage level is reached during the overall change which is occurring. When such a next level is reached, then step 26 is initiated and a new current voltage output signal is generated for supply back to the performance controller 2 to indicate the new voltage level which the voltage controller 6 is capable of supporting. This may be an intermediate voltage level on the way to the eventual target voltage level, or at the end of the slew is the final target voltage level itself. The performance controller 2 can act upon this current voltage output signal fed back to it to control the clock generator and possibly the performance monitoring circuits. Step 28 determines whether the final voltage has yet been reached. If the final voltage has not yet been reached, then processing is returned to step 24 and slewing of the voltage output continues towards its eventual target. In a system supporting only two voltage levels the system would simply wait for the final voltage level to be reached without the intermediate voltage levels.

It will be appreciated that FIG. 4 assumes that the control signal does not change. In practice, the control signal may change before the final target voltage is reached. It may be that the need for a temporary change in performance level as determined by the program instructions within the operating system has gone away, such as an interrupt having been serviced or a panic mode signal having been de-asserted. In such circumstances, the control illustrated in FIG. 4 is interrupted and processing returned to step 20 where action based upon the newly established control signal value is initiated. It will be appreciated that the control by the software is at least partially open loop in that it merely specifies which performance level it desires at a particular point in time but does not require monitoring of what performance is actually delivered or when the performance level is actually delivered.

As mentioned, a panic signal (priority signal or hardware override signal) may be supplied to the performance controller 2 to override any software control of the performance level and temporarily increase the performance level to a maximum level. Bypassing of the software control of performance level can facilitate more rapid and direct switching to maximum performance levels under purely hardware control, such as in response to specific high priority hardware interrupt signals. More than one such "panic" signal may be provided, e.g. a "Low-Battery-Panic" signal might force performance to a known reduced level.

Figure 5:
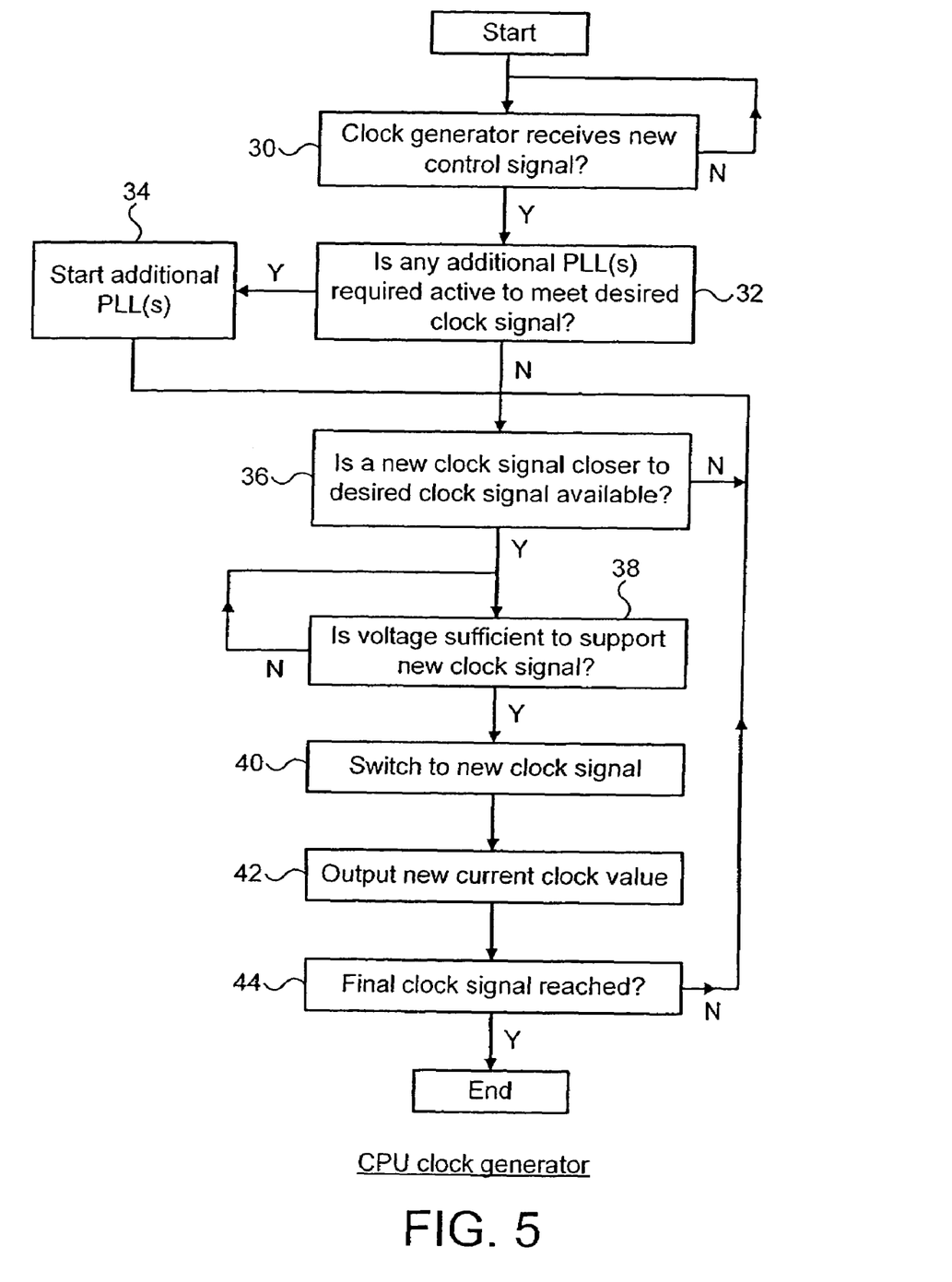
FIG. 5 is a flow diagram schematically illustrating the control of a clock generator.

FIG. 5 schematically illustrates the control of the clock generator 4. At step 30 the clock generator waits to receive a new control signal. When a new control signal is received, processing proceeds to step 32 at which a determination is made as to whether or not any additional phase lock loop circuit 12 needs to be powered up to service the ultimately required new clock frequency. If such additional phase lock loop circuits 12 are required, then processing proceeds to step 34 where they are started. Alternatively, processing proceeds directly to step 36.

At step 36 the clock generator determines whether a new clock signal closer to the requested performance level is available. This facilitates the adoption of intermediate performance levels pending the availability of the eventual target performance level. When such an intermediate clock frequency is identified, then processing proceeds to step 38. Step 38 determines whether or not the current operation signal value fed back from the voltage controller 6 indicates that a voltage is being generated that is capable of sustaining the new clock signal value. When such a voltage is available, then processing proceeds to step 40 at which the new clock signal value is adopted and generated by the CPU clock generator as signal cpuclk which is supplied to the processor core. Step 42 then outputs a new current clock value back to the performance controller 2 where it may be acted upon by the performance monitoring hardware to assess the forward progress through the code. Step 44 determines whether or not the switch to the new clock frequency has been the switch to the final clock frequency which was specified by the program instruction generated desired data processing performance request. If the final target clock frequency has not been reached, then processing returns to step 36, otherwise the control terminates, (effectively returns to step 30).

As for FIG. 4, FIG. 5 also assumes that the desired data processing performance level specified by the program instructions does not change. If this does change, then a new mapped control signal value will be generated which interrupts the processing illustrated in FIG. 5 and returns the processing to step 30 whereupon the new control signal value is acted upon.

The adoption of intermediate clock frequency values whilst changing between an initial and a final clock frequency value allows the best forward progress through the code to be achieved for the particular state of the circuits concerned. The circuits do not stay operating at the initial clock frequency until the eventual target clock frequency becomes available, but instead ramp up or down through a sequence of clock frequencies as each becomes available during the performance slew. The adoption of a new clock frequency can be considered to be controlled by a logical AND of a signal indicating that the frequency is closer to the target frequency than the current frequency, a signal indicating the availability of that frequency from a clock source together with a signal indicating that the voltage controller is capable of producing a power signal having a voltage sufficient to sustain operation at that new clock frequency. Alternatively, in other embodiments having only two performance levels (MAX/IDLE), the system would wait for the final voltage before making the switch.

Figure 6:
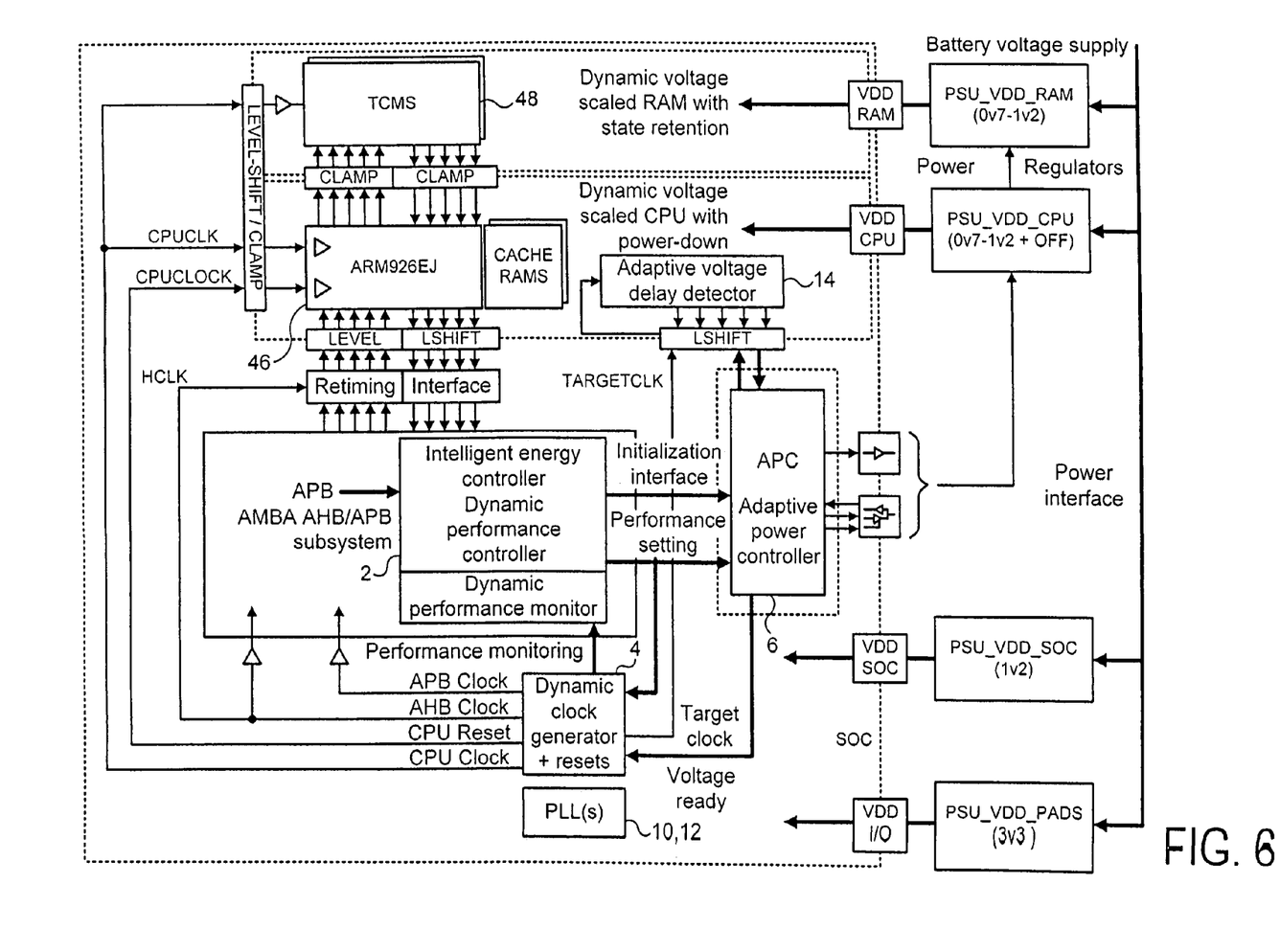
FIG. 6 is a diagram schematically illustrating another example of a data processing system utilising the current techniques.

FIG. 6 is a diagram schematically illustrating a data processing system utilising the current techniques. Like elements to those illustrated in FIG. 1 are given like reference numerals. FIG. 6 additionally illustrates the processor 46 which executes the program instructions, which may be held within a tightly coupled memory system 48 or some other memory. The different voltage domains concerned necessitate level shifters to be provided at various interfaces in the circuit as illustrated.

Figure 7:
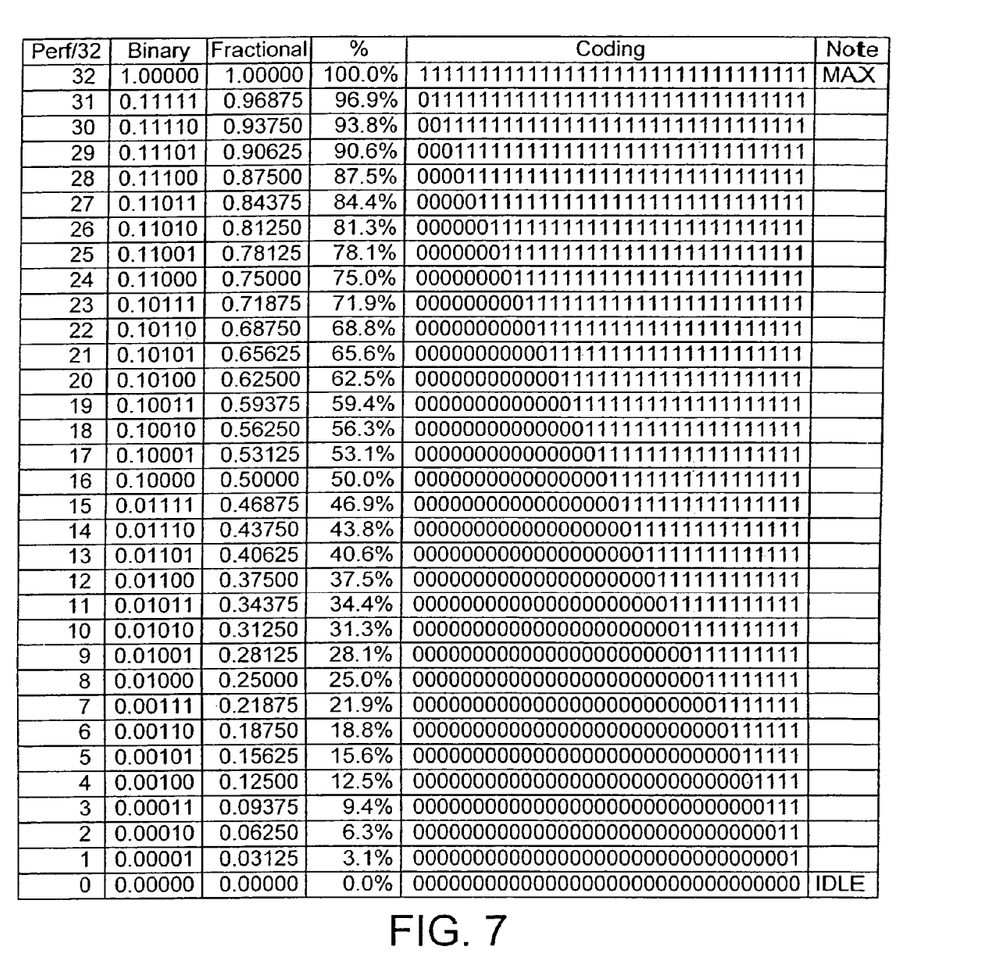
FIG. 7 is a diagram schematically illustrating a further example of a mapping between a desired performance level and a control signal value.

FIG. 7 illustrates another example mapping between desired data processing performance request level and thermometer coded control signal value. In this case a 32-bit thermometer coded control signal value is used yielding the possibility of a finer grained control of performance. It may be that the further circuits which respond to these 32-bit control signal values are in fact only capable of providing more coarsely grained control and so will effectively internally quantise the control signal values concerned. The thermometer coded control signal values provide a particularly convenient way of combining control signal values from different sources, such as from different processors on a multiprocessor system, whereby the overall performance level, which may be controllable only on a chip-wide basis, can be properly selected. A maximum control signal value can be determined by a logical OR of the control signal values, a minimum control signal value may be determined by a logical AND of the control signal value and equivalence may be determined by the XOR of the control signal values. The maximum function may be useful in determining the maximum requested clock frequency, the minimum function may be useful in indicating the minimum sustainable voltage and the equivalents function may be useful in determining a match between requirements of different elements.

Figure 8:
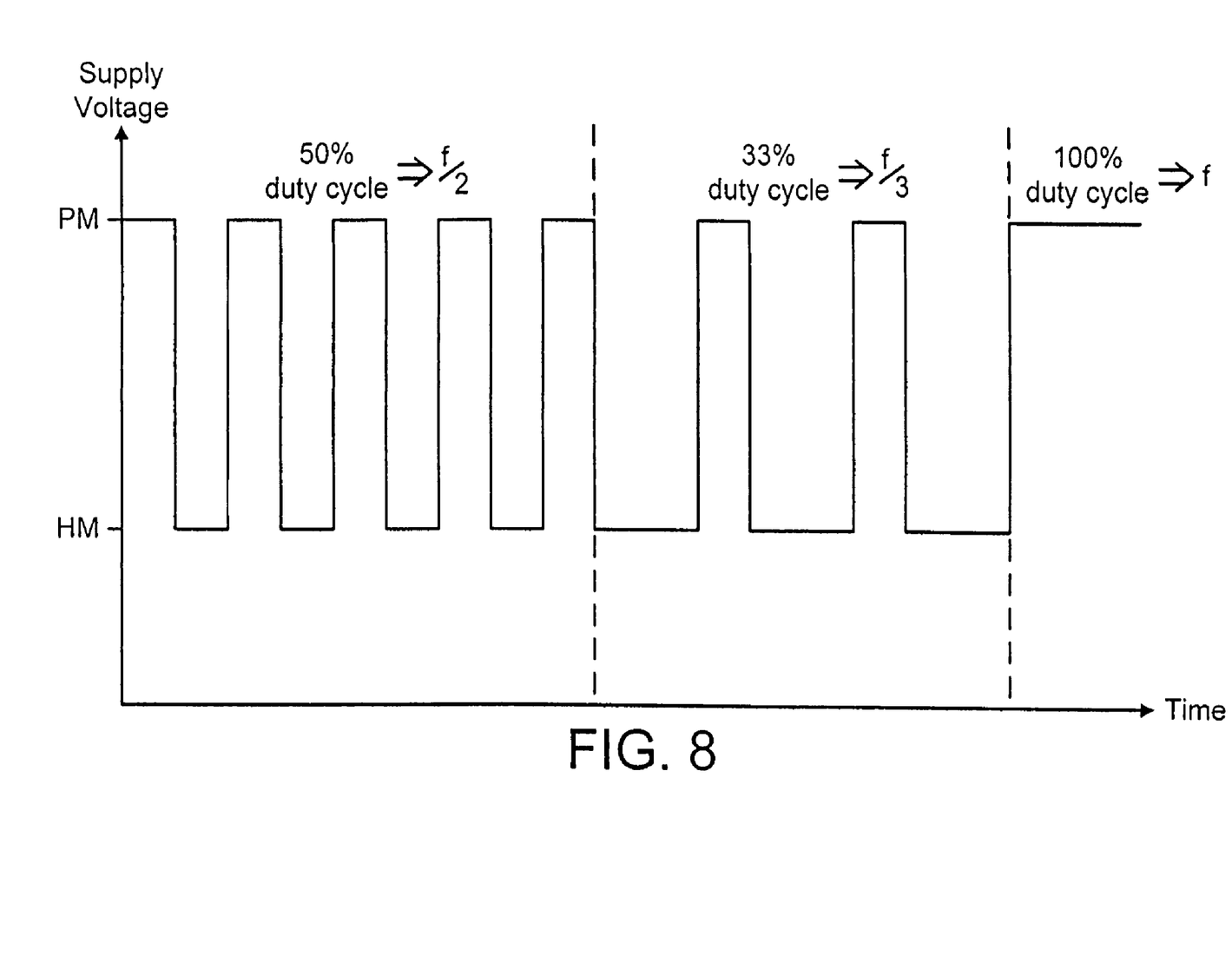
FIG. 8 illustrates the modulation of power supply voltage between a holding mode level and a processing mode level.

FIG. 8 illustrates another performance control technique. In this example the supply voltage to a processing circuit is shown as being modulated (in this example pulse width modulated) between a holding mode voltage level HM and a processing mode voltage level PM. When in the holding mode the processing circuit is not clocked and makes no progress through the code being executed. When in the processing mode, the processing circuit is clocked at its full clock signal rate and makes progress through the code being executed. The first portion of FIG. 8 illustrates the situation in which the processing circuit is in the processing mode for 50% of the time and accordingly can be considered effectively to be operating at a clock frequency of half of the supplied clock frequency. The power supply configuration, in this case the supply rail voltage (although body biasing or other techniques may be employed), is such that in the holding mode the energy consumption of the processing circuit is reduced. Thus, the processing circuit consumes less energy operating as shown since it spends half of its time in the lower energy consumption holding mode compared with being permanently in the processing mode.

In the middle portion of FIG. 8 a different modulation duty cycle ratio of 33% is used and the effective clock frequency is thus ⅓ of its maximum rate. In the final portion of FIG. 8, the system is seen to be operating 100% of its time in the processing mode and is thus effectively operating at the full fixed clock frequency rate.

Figure 9:
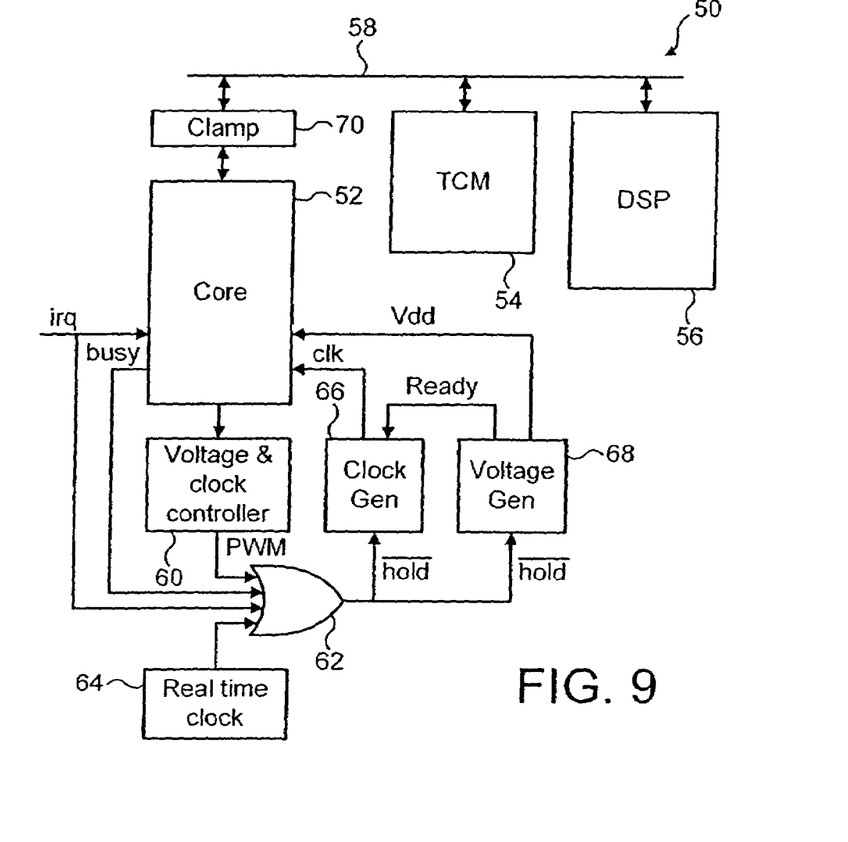
FIG. 9 schematically illustrates a circuit incorporating the technique of FIG. 8.

FIG. 9 schematically illustrates a data processing system 50 comprising a processor core 52, a tightly coupled memory 54 and a DSP circuit 56 all linked by a bus 58. The processor core 52 is subject to the above described performance control technique of FIG. 8 and is switched between a processing mode and a holding mode. A voltage and clock controller 60 receives a target performance level request from the processor core 52, possibly as generated by an operating system or other code executing on the processor core 52, and uses this to generate a pulse width modulated signal PWM selected to give an appropriate duty ratio at the fixed clock frequency to achieve the desired performance level. An OR gate 62 ORs this PWM signal with a busy signal generated by the processor core 52, an interrupt signal irq and a real-time clock request signal generated by a real-time clock circuit 64. Any of the busy signal, the interrupt signal irq and the real-time clock request signal can override the PWM signal and force the system into the processing mode when the PWM signal would otherwise place it in the holding mode.

The output of the OR gate 62 is supplied to a clock generator 66 and a voltage generator 68. When the output of the OR gate 62 indicates that the processing mode is required, then the clock generator 66 generates its clock signal clk which is supplied to the processor core 52 once the clock generator circuit 66 has received a ready signal from the voltage generator 68 indicating that the voltage generator 68 has successfully changed the power supply configuration of the processor core 52 into the processing mode configuration and this is now sufficiently stable to support clocking of the processor circuit 52. The processor core 52 generates a busy signal when it is not safe to switch the processor core 52 from the processing mode to the holding mode, e.g. when there are pending data transfers to further circuits, such as the tightly coupled memory 54 or the DSP circuit 56 via the bus 58. The processor core 52 uses active high signaling with the further circuit elements such as the tightly coupled memory 54 and the DSP circuit 56 such that clamping circuits 70 can clamp these to a ground level when the processor core 52 is placed into the holding mode or is completely powered down.

Figure 10:
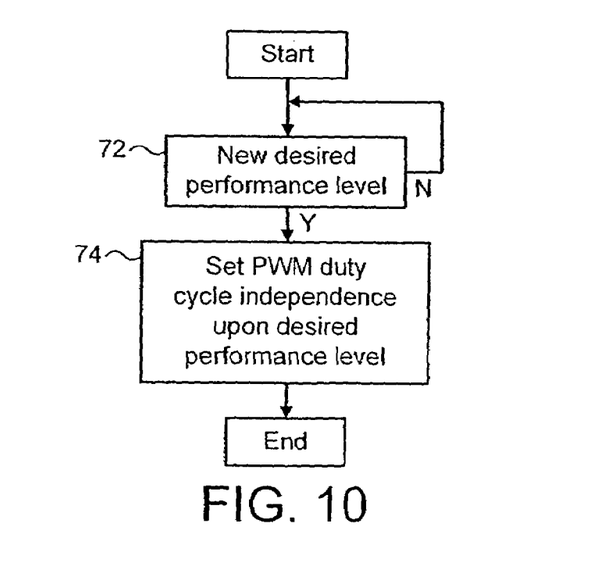
FIG. 10 is a flow diagram schematically illustrating the control of performance using a modulated voltage.

FIG. 10 schematically illustrates a flow diagram of how the performance control may be achieved by the voltage and clock controller 60. At step 72 a new desired performance level is indicated to the voltage and clock controller 60 by the processor core 52. At step 74 this desired performance level is converted into an appropriate pulse width modulation duty cycle in dependence upon a lookup in a mapping table, hardwired logic or by means. It will be appreciated that this example uses pulse width modulation, but other modulation schemes are also possible such as a scrambled sequence PWM scheme or other schemes.

Figure 11:
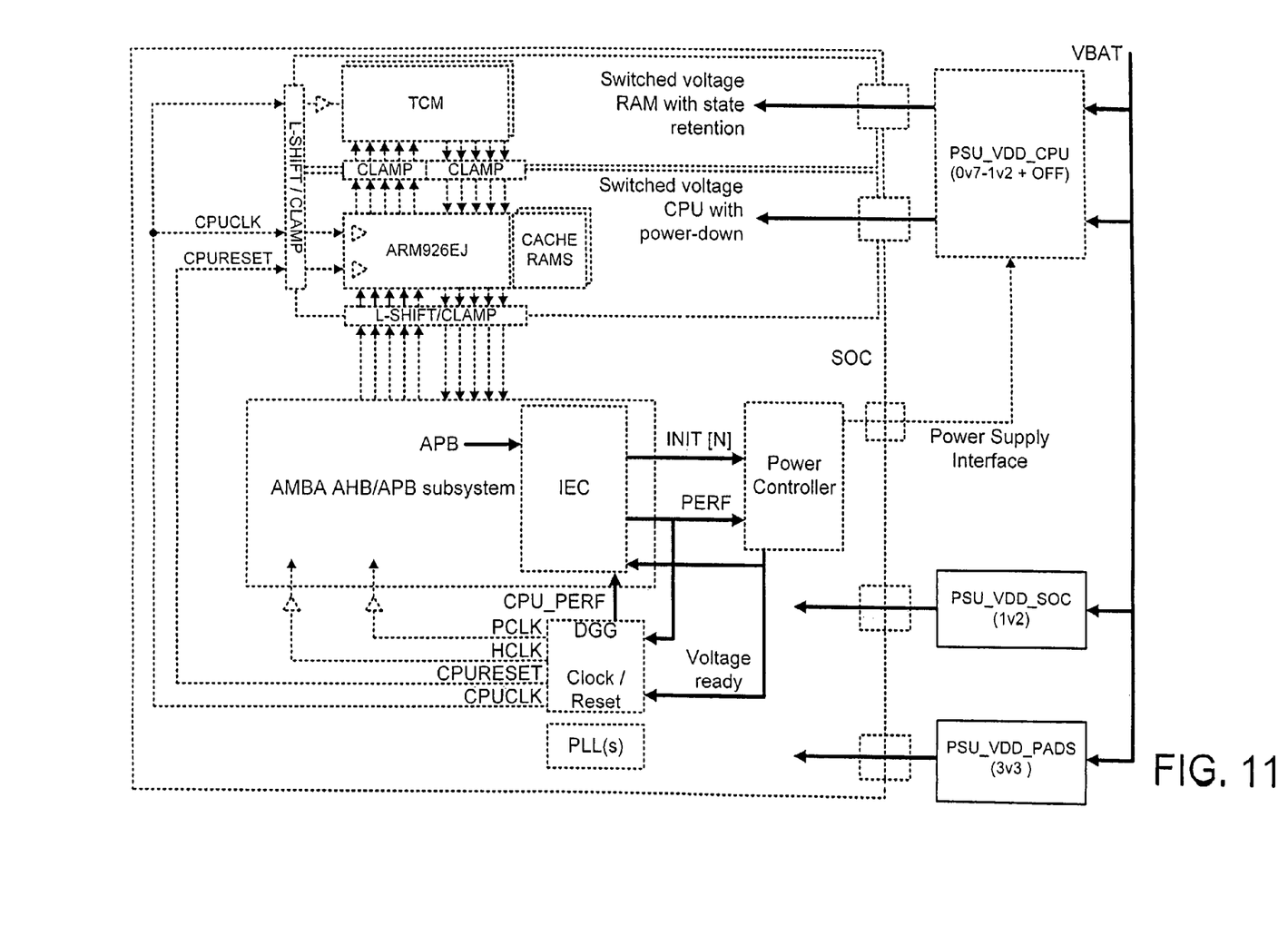
FIG. 11 is a diagram schematically illustrating another data processing system using the technique of FIG. 8.

FIG. 11 illustrates a further circuit using the technique of FIG. 8. This circuit is similar to that of FIG. 6 noting that at least some of the level shifting circuits have been replaced by clamp circuits and switched power domains are used rather than dynamic voltage scale domains.

Figure 12:
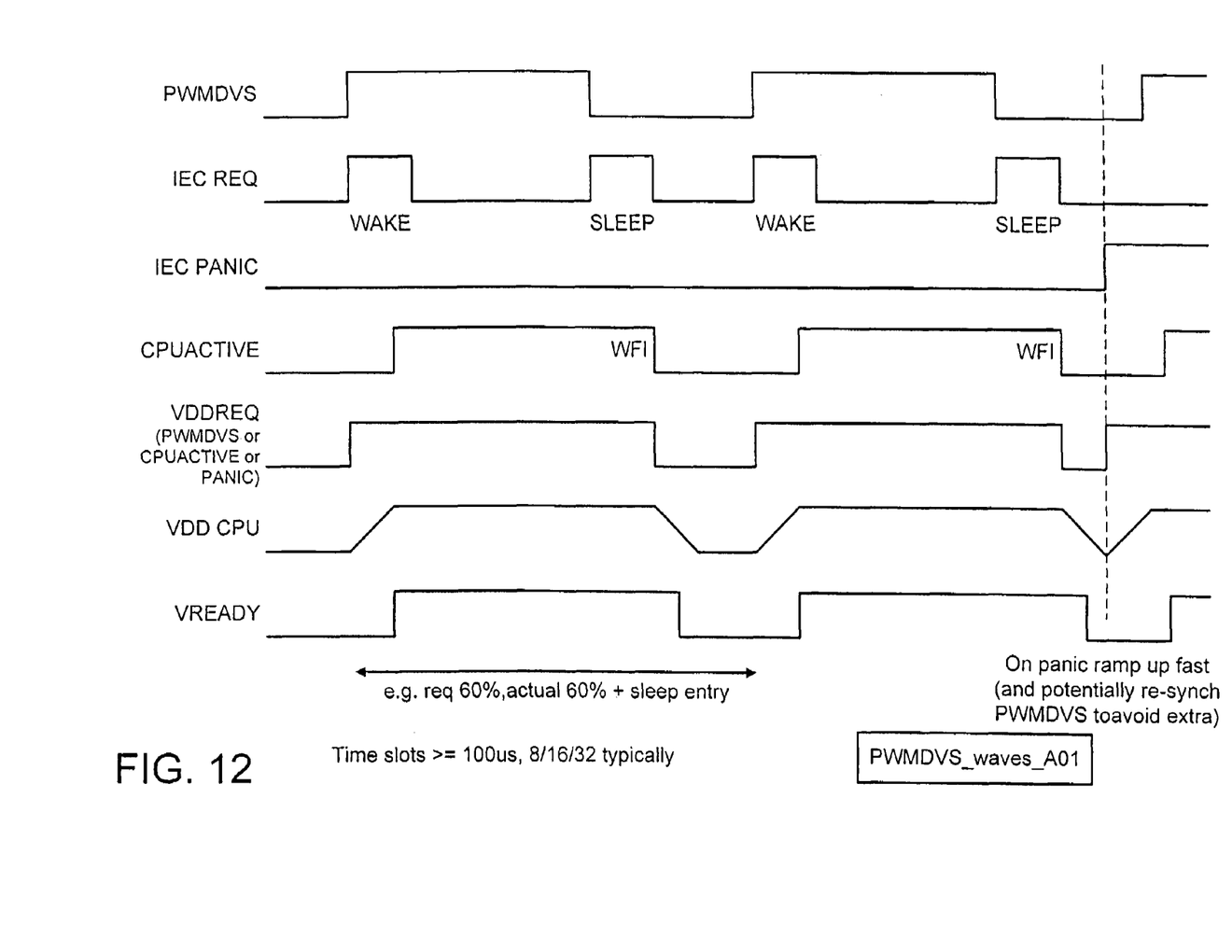
FIG. 12 is a diagram illustrating various control signals used in embodiments such as those of FIGS. 8 to 11.

FIG. 12 illustrates the PWMDVS signal produced by the voltage and clock controller 60 to command a desired performance level. The IEC REQ signal indicates successive signals being sent to a intelligent energy controller to trigger sleep and wake actions as the system moves into and out of the holding mode. The IEC PANIC signal is a priority signal for overriding the PWMDVS signal. The CPUACTIVE signal is the busy signal indicating that it is not yet safe to stop the clock to the CPU.

The VDDREQ is the output of the OR gate 62. The VDD CPU is the signal output from the voltage generator 68 and shows the finite slew rate. VREADY is the signal from the voltage generator 68 indicating to the clock generator that the clock switch can be made. It should be noted that a switch to the processing mode is not made until the slew is complete, but switching to the holding mode can take place sooner.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
 a processing circuit having a power supply configuration and driven by a clock signal, said processing circuit including:
 (i) a processing mode for performing data processing operations when said power supply configuration has a processing configuration and said clock signal is clocked; and
 (ii) a holding mode for holding state without performing data processing operations when said power supply has a holding configuration and said clock signal is stopped; and
 a power supply and clock signal control circuit, responsive to a target rate signal indicative of a target rate of data processing operations to be performed by said processing circuit, to modulate a target rate mode control signal to switch said processing circuit between said processing mode and said holding mode so as to achieve said target rate.

2. Apparatus as claimed in claim 1, comprising one or more further circuits coupled to said processing circuit.

3. Apparatus as claimed in claim 1, wherein said processing circuit is operable to generate a busy signal indicative of whether said processing circuit can be switched from said processing mode to said holding mode, said power supply and clock signal control circuit being responsive to said busy signal to override said target rate mode control signal to prevent a switch of said processing circuit from said processing mode to said holding mode independent of said target rate.

4. Apparatus as claimed in claim 3, wherein said processing circuit is operable to assert said busy signal when a signal transfer is pending between said processing circuit and at least one of said one or more further circuits.

5. Apparatus as claimed in claim 1, wherein said power supply and clock signal control circuit is responsive to a priority signal to override said target rate mode control signal to:
(i) switch said processing circuit from said holding mode to said processing mode independent of said target rate; and
(ii) to prevent a switch of said processing circuit from said processing mode to said holding mode independent of said target rate.

6. Apparatus as claimed in claim 5, wherein said priority signal is one of:
(i) an interrupt signal; and
(ii) a hardware real-time timer signal.

7. Apparatus as claimed in claim 1, wherein said target rate mode control signal, said busy signal and said priority signal are logically combined to generate a signal operable to switch said processing circuit between said processing mode and said holding mode.

8. Apparatus as claimed in claim 1, wherein said holding configuration corresponds to a power supply to said processing circuit having a potential difference lower than said potential difference corresponding to said processing configuration.

9. Apparatus as claimed in claim 8, wherein said processing circuit has a lower power consumption configuration when in said holding mode than when in said processing mode.

10. Apparatus as claimed in claim 8, wherein in said holding mode said potential difference of said power supply to said processing circuit is insufficient to allow said processing circuit to be clocked.

11. Apparatus as claimed in claim 2, wherein one or more signal clamping circuits are provided between said processing circuit and said one or more further circuits.

12. Apparatus as claimed in claim 1, wherein said processing circuit is a processor core.

13. Apparatus as claimed in claim 2, wherein active high signaling is used from said processing circuit and said one or more further circuits.

14. Apparatus as claimed in claim 1, comprising a clock generator operable to generate a clock source signal having a fixed frequency which is selectively supplied to said processing circuit in dependence upon whether said processing circuit is in said processing mode or said holding mode.

15. Apparatus as claimed in claim 14, comprising a power supply generator, wherein when switching from said holding mode to said processing mode, said power supply generator sends a ready signal to said clock generator to indicate that said power supply configuration has reached said processing configuration such that said clock signal may be started.

16. A method of processing data, said method comprising the steps of:
operating a processing circuit powered by a power supply signal and driven by a clock signal such that:
(i) in a processing mode said processing circuit performs data processing operations when said power supply signal has a processing configuration and said clock signal is clocked; and
(ii) in a holding mode said processing circuit holds state without performing data processing operations when said power supply has a holding configuration and said clock signal is stopped; and
in response to a target rate signal indicative of a target rate of data processing operations to be performed by said processing circuit using a power supply and clock signal control circuit to modulate a target rate mode control signal to switch said processing circuit between said processing mode and said holding mode so as to achieve said target rate.

17. A method as claimed in claim 16, wherein one or more further circuits are coupled to said processing circuit.

18. A method as claimed in claim 16, wherein said processing circuit is operable to generate a busy signal indicative of whether said processing circuit can be switched from said processing mode to said holding mode, said power supply and clock signal control circuit being responsive to said busy signal to override said target rate mode control signal to prevent a switch of said processing circuit from said processing mode to said holding mode independent of said target rate.

19. A method as claimed in claim 17, wherein said processing circuit is operable to assert said busy signal when a signal transfer is pending between said processing circuit and at least one of said one or more further circuits.

20. A method as claimed in claim 16, wherein said power supply and clock signal control circuit is responsive to a priority signal to override said target rate mode control signal to:
(i) switch said processing circuit from said holding mode to said processing mode independent of said target rate; and
(ii) to prevent a switch of said processing circuit from said processing mode to said holding mode independent of said target rate.

21. A method as claimed in claim 20, wherein said priority signal is one of:
(i) an interrupt signal; and
(ii) a hardware real-time timer signal.

22. A method as claimed in claim 16, wherein said target rate mode control signal, said busy signal and said priority signal are logically combined to generate a signal operable to switch said processing circuit between said processing mode and said holding mode.

23. A method as claimed in claim 16, wherein said holding configuration corresponds to a power supply to said processing circuit having a potential difference lower than said potential difference corresponding to said processing configuration.

24. A method as claimed in claim 23, wherein said processing circuit has a lower power consumption when in said holding mode than when in said processing mode.

25. A method as claimed in claim 23, wherein in said holding mode said potential difference of said power supply to said processing circuit is insufficient to allow said processing circuit to be clocked.

26. A method as claimed in claim 17, wherein one or more signal clamping circuits are provided between said processing circuit and said one or more further circuits.

27. A method as claimed in claim 16, wherein said processing circuit is a processor core.

28. A method as claimed in claim 17, wherein active high signaling is used from said processing circuit and said one or more further circuits.

29. A method as claimed in claim 16, wherein a clock generator is operable to generate a clock source signal having a fixed frequency which is selectively supplied to said processing circuit in dependence upon whether said processing circuit is in said processing mode or said holding mode.

30. Method as claimed in claim 29, wherein when switching from said holding mode to said processing mode, a power supply generator sends a ready signal to said clock generator to indicate that said power supply configuration has reached said processing configuration such that said clock signal may be started.

* * * * *